Dec. 1, 1936.  C. D. PETERSON  2,062,927
METHOD OF FORMING A HELICAL GEAR WITH CLUTCH TEETH
Filed Dec. 19, 1932
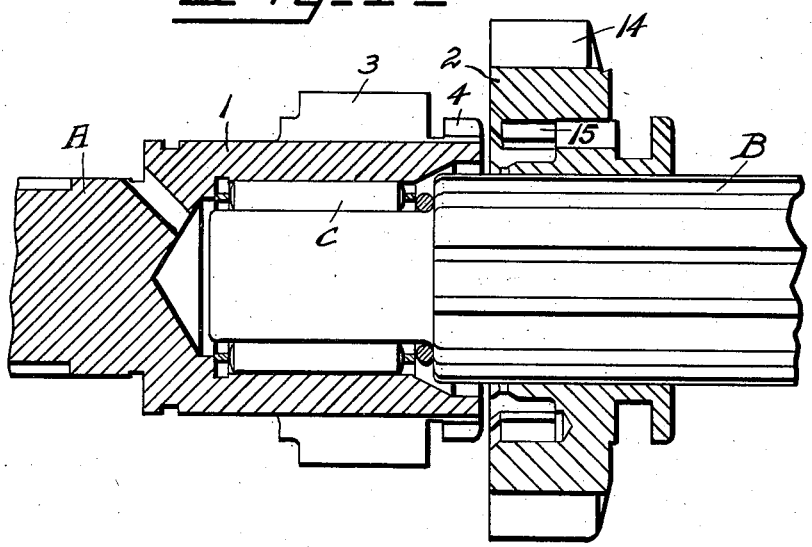
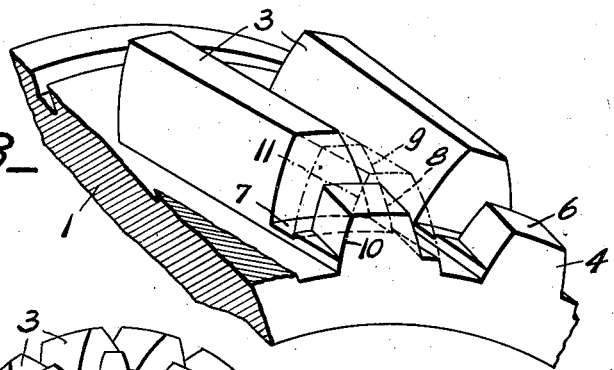
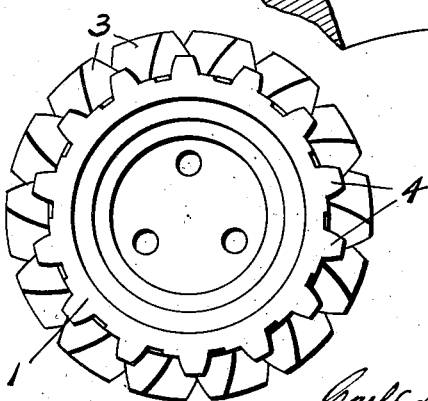
INVENTOR.
Carl D. Peterson
BY Bodell & Thompson
ATTORNEYS.

Patented Dec. 1, 1936

2,062,927

UNITED STATES PATENT OFFICE 2,062,927

METHOD OF FORMING A HELICAL GEAR WITH CLUTCH TEETH

Carl D. Peterson, Toledo, Ohio, assignor to Spicer Manufacturing Corporation, Toledo, Ohio, a corporation of Virginia Application December 19, 1932, Serial No. 647,917

1 Claim. (Cl. 29—159.2)

This invention has for its principal object, a method of forming a helical gear with teeth at one end parallel to the axis of the gear and formed from end portions of the helical teeth.

The invention consists in the method and steps hereinafter set forth and claimed.

In describing this invention, reference is had to the accompanying drawing in which like characters designate corresponding parts in all the views.

Figure 1 is a sectional view of a helical gear provided with parallel clutch teeth at one end, the coacting clutch section with teeth for coacting with the parallel teeth, and also the shafts on which the helical gear and clutch section are mounted, being shown.

Figure 2 is an end view of the helical gear looking to the left, Figure 1.

Figure 3 is a fragmentary, isometric view of the helical and parallel teeth.

I have here illustrated my invention as embodied in a direct drive, or high speed clutch, of a transmission gearing used in motor vehicles.

As will be understood by those skilled in the art, the transmission mechanism includes a drive shaft, a driven shaft, and a countershaft, all suitably mounted in the gear box, the transmission shaft being arranged in axial alinement to the drive shaft, and being connectible thereto through a direct drive, or high speed clutch. Other drives, or changes, in speed are effected through gears on the countershaft and transmission shaft, some of which are shiftable.

The drive shaft is connected to the countershaft through intermeshing gears, and the countershaft to the transmission shaft through gears, some of which are shiftable. The drive shaft is usually the stem of a stem gear 1 which meshes with a gear on the countershaft to drive the countershaft. A designates the drive shaft, B the transmission shaft in line therewith, it having a pilot bearing C in the drive shaft, or the gear thereon. The stem gear 1 is usually formed with one section of the direct drive, or high speed clutch, and is usually formed integral with the drive shaft A.

2 designates the other section of the direct drive clutch and is slidably mounted on the transmission shaft B, and shiftable in any well known manner. The sections of the high speed clutch have inter-engaging teeth, these being usually external teeth on the driving section, or gear 1, and internal teeth on the section 2. These teeth are in the nature of gear teeth, and are referred to in shop parlance as clutch gears.

The subject matter of this invention is in the forming of such teeth, or clutch gear teeth on the driving section, or gear 1, when the gear is a helical gear.

The method consists in forming the gear with helical teeth extending from end to end and cutting end portions of the helical teeth so that the flanks of the end portions are parallel to the axis of the gear and located within continuations of the flanks of the helical teeth, and also preferably cutting the top faces of the end portions lying within the circle of the top faces of the helical teeth with the corners formed at angles of the flanks and top faces of the end portions parallel to the axis of the gear. To facilitate the forming of the end portions in clutch gear teeth, an annular groove is cut separating the helical teeth from the end portions, or clutch gear teeth.

3 designates the helical teeth of the gear 1. 4 designates the teeth, which are parallel to the axis of the gear 1, that is, the clutch gear teeth, these being hereinafter referred to for convenience, as parallel teeth, as they are parallel to the axis of the gear 1. The parallel teeth 4 are formed from end portions of the spiral teeth 3, and located entirely between lineal continuations of side faces or flanks of the helical teeth of the gear proper, so that, as seen in Figure 3, the top faces 6 of the parallel teeth have their inner and outer end portions formed partly in the flank portions of the helical teeth, or lineal continuations thereof. An annular groove, or relief 7 is provided between opposing ends of the helical teeth of the gear, and the parallel or clutch teeth, of the gear.

In forming the helical gear with the parallel clutch teeth, the gear blank is formed with the helical teeth extending from end to end thereof, thereafter the relief, or annular groove 7, cut, and then the end portions of the helical teeth cut down so that the flanks of said end portions are parallel to the axis of the gear. Thus, the edge 8 of the corner formed by one flank of the parallel tooth and the inner end face of the parallel tooth, is located in the flank line 9 of the helical tooth, or the continuation thereof, and its diagonally opposite edge 10 of the corner formed by the other flank and the outer or front end of the parallel tooth, is located in the flank line 11 of the helical tooth, or continuation thereof. This arrangement gives a maximum thickness to the parallel tooth for a given length of parallel teeth and/or a given angle of the helical teeth.

The other section 2 of the clutch is provided with external teeth 14 for meshing with a gear on the countershaft, not shown, in the usual manner, and also with internal teeth 15 for co-acting with the parallel teeth 4. The internal teeth 15 are formed in any well known manner, and the formation thereof constitutes no part of this invention.

This helical gear with clutch teeth is particularly simple and economical in manufacture.

What I claim is:

The method of providing helical gears with teeth at one end parallel to the axis of the gear consisting in forming the gear blank with helical teeth and then straightening corresponding end portions of the helical teeth by cutting off the opposite helical side faces of said end portions into lines parallel with the axis of the gear.

CARL D. PETERSON.